US008058553B2

(12) United States Patent
Saito et al.

(10) Patent No.: US 8,058,553 B2
(45) Date of Patent: Nov. 15, 2011

(54) ELECTRONIC DEVICE

(75) Inventors: Ryosuke Saito, Koganei (JP); Toshio Konno, Akiruno (JP); Tomomi Murayama, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/903,108

(22) Filed: Oct. 12, 2010

(65) Prior Publication Data
US 2011/0155448 A1 Jun. 30, 2011

(30) Foreign Application Priority Data
Dec. 25, 2009 (JP) ................................. 2009-296177

(51) Int. Cl.
*H01R 13/46* (2006.01)
(52) U.S. Cl. ...................... 174/60; 174/135; 361/679.26
(58) Field of Classification Search .................. 174/135, 174/60; 361/679.26, 679.29, 679.3
See application file for complete search history.

(56) References Cited

U.S. PATENT DOCUMENTS

| | | | | |
|---|---|---|---|---|
| 5,933,563 A * | 8/1999 | Schaffer et al. | ............... | 385/135 |
| 6,809,258 B1 * | 10/2004 | Dang et al. | ...................... | 174/50 |
| 6,812,403 B2 * | 11/2004 | Reau et al. | ....................... | 174/50 |
| 7,057,889 B2 * | 6/2006 | Mata et al. | ..................... | 600/301 |
| 7,459,634 B2 * | 12/2008 | Martin et al. | .................... | 174/97 |
| 7,501,580 B2 * | 3/2009 | Pagoto et al. | ............. | 174/138 E |
| 2003/0168238 A1 * | 9/2003 | Masuda et al. | ............... | 174/72 A |
| 2005/0168499 A1 * | 8/2005 | Williams et al. | ................ | 345/905 |
| 2005/0213290 A1 * | 9/2005 | Lauffer et al. | ................ | 361/681 |
| 2008/0236858 A1 * | 10/2008 | Quijano | ........................... | 174/50 |
| 2008/0254671 A1 * | 10/2008 | Tracy et al. | .................... | 439/371 |

FOREIGN PATENT DOCUMENTS

| | | |
|---|---|---|
| JP | U 06-44190 | 6/1994 |
| JP | U 06-62581 | 9/1994 |
| JP | 10-178728 A | 6/1998 |
| JP | 2000-033346 A | 11/2000 |

OTHER PUBLICATIONS

Notice of Rejection mailed by Japan Patent Office on Nov. 30, 2010 in the corresponding Japanese patent application No. 2009-296177.

* cited by examiner

*Primary Examiner* — Hung Ngo
(74) *Attorney, Agent, or Firm* — Knobbe Martens Olson & Bear LLP

(57) ABSTRACT

According to one embodiment, an electronic device includes a housing, an outer wall, a rib, a cable, and a stopper. The housing houses at least part of an electronic component. The outer wall constitutes at least part of an outer contour of the housing. The rib is located between the outer wall and the electronic component, and the outer surface of the rib faces the inner surface of the outer wall. The cable is routed between the outer wall and the rib. The stopper is housed in the housing, and engages the rib to prevent the rib from inclining toward the outer wall.

10 Claims, 10 Drawing Sheets

ELECTRONIC DEVICE

CROSS-REFERENCE TO RELATED APPLICATIONS

This application is based upon and claims the benefit of priority from Japanese Patent Application No. 2009-296177, filed Dec. 25, 2009, the entire contents of which are incorporated herein by reference.

FIELD

Embodiments described herein relate generally to an electronic device.

BACKGROUND

For example, Japanese Patent Application Publication (KOKAI) No. H10-178728 discloses a conventional electronic device having a housing in which a cable is routed between an electronic component and the outer wall of the housing, and the cable is supported by the rib.

If this type of electronic device accidentally falls off, the electronic component may move toward the outer wall side in the housing due to the impact of the fall. Accordingly, the electronic device has been required to be configured such that damage to the cable can be prevented even in such a case.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings. In general, according to one embodiment, an electronic device comprises a housing, an outer wall, a rib, a cable, and a stopper. The housing is configured to house at least part of an electronic component. The outer wall is configured to constitute at least part of an outer contour of the housing. The rib is located between the outer wall and the electronic component, and the outer surface of the rib faces the inner surface of the outer wall. The cable is configured to be routed between the outer wall and the rib. The stopper is housed in the housing, and is configured to engage the rib to prevent the rib from inclining toward the outer wall.

According to another embodiment, an electronic device comprises a housing, an outer wall, a plurality of ribs, and a plurality of cables. The housing is configured to house at least part of an electronic component. The outer wall is configured to constitute at least part of an outer contour of the housing. The ribs are located between the outer wall and the electronic component, and the outer surface of the ribs faces the inner surface of the outer wall. The cables are configured to be routed between the outer wall and the ribs, and arranged in parallel in a direction along the outer surface or the inner surface between the outer wall and at least one of the ribs.

Figure 1:
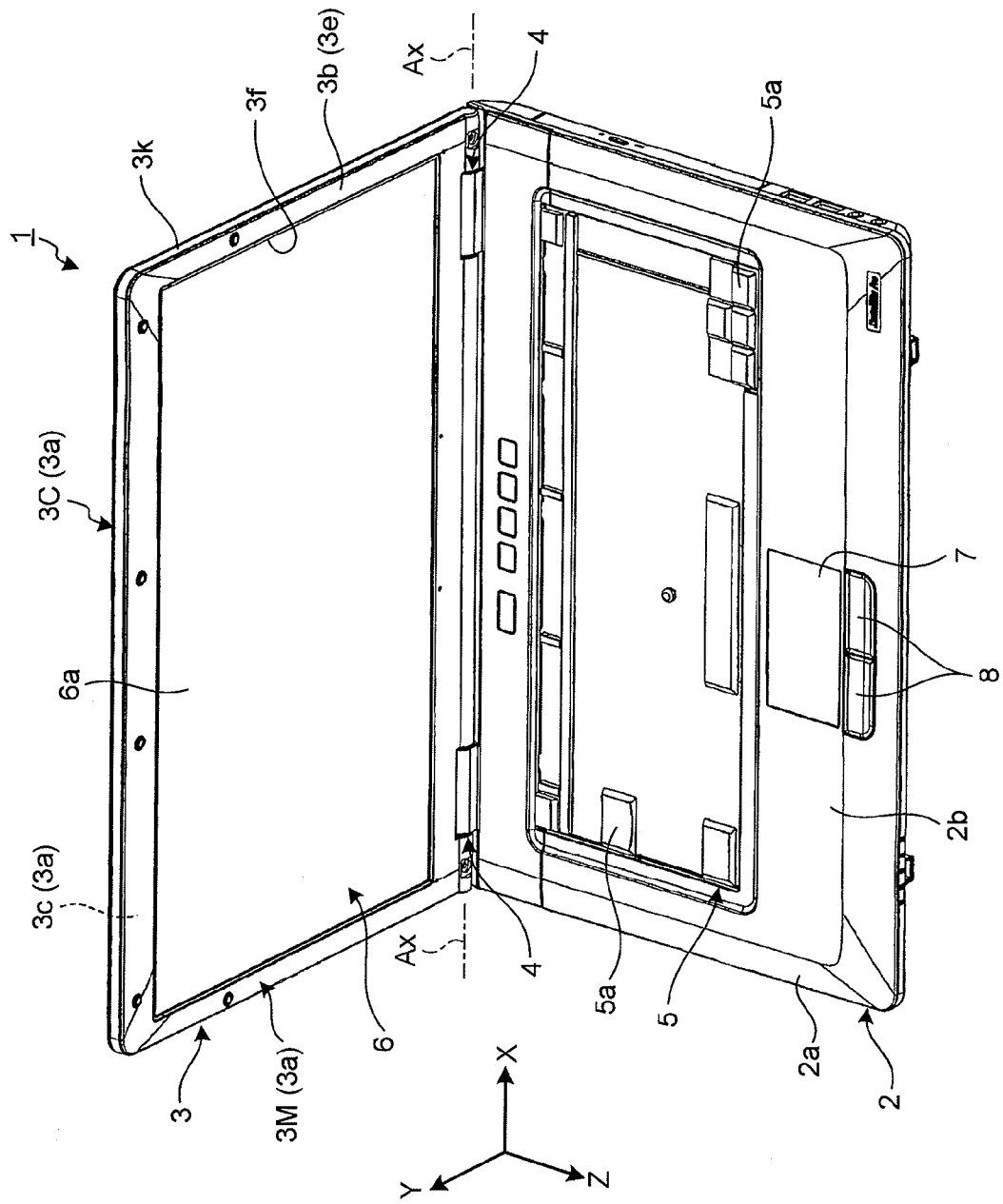
FIG. 1 is an exemplary perspective view of an electronic device according to an embodiment.

As illustrated in FIG. 1, an electronic device 1 of an embodiment is, for example, a notebook personal computer. The electronic device 1 comprises a flat rectangular first body 2 and a flat rectangular second body 3. The first body 2 and the second body 3 are connected by a hinge mechanism 4 to be relatively rotatable about a rotation axis Ax between an open position (FIG. 1) and a closed position (not illustrated). Hereinafter, for the sake of convenience, the width direction (horizontal direction) of the second body 3 will be referred to as "X direction", the direction to the edge of the second body 3 will be referred to as "Y direction", and the thickness direction of the second body 3 will be referred to as "Z direction". X, Y, and Z axes are perpendicular to one another.

The first body 2 is provided with a keyboard 5 as an input device, a pointing device 7, a click button 8, and the like, which are exposed on a front surface 2b as the outer surface of a housing 2a. On the other hand, the second body 3 is provided with a display device 6 such as a liquid crystal display (LCD) panel as an electronic component, which is exposed on a front surface 3b as the outer surface of a housing 3a. When the first body 2 and the second body 3 are in the open position, the keyboard 5, the display device 6, and the like are exposed to allow the user to use them. On the other hand, in the closed position, the front surface 2b closely faces the front surface 3b, and the keyboard 5, the display device 6, the pointing device 7, the click button 8, and the like are covered between the housings 2a and 3a. Incidentally, FIG. 1 does not illustrate all keys of the keyboard 5 but only keys 5a.

The second body 3 is shaped in a rectangle that is long in the X direction and short in the Y direction in a plan view from the Z direction, and is thin and flat in the Z direction. The second body 3 comprises a housing 3a. The housing 3a comprises a first divisional body 3C and a second divisional body 3M. The first divisional body 3C has a bottom wall 3d that forms a back surface 3c. The second divisional body 3M has a top wall 3e that forms the front surface 3b. An opening 3f is formed in the center of the front surface 3b (the top wall 3e) of the second divisional body 3M, and a display surface 6a of the display device 6 is exposed from the opening 3f.

Figure 2:
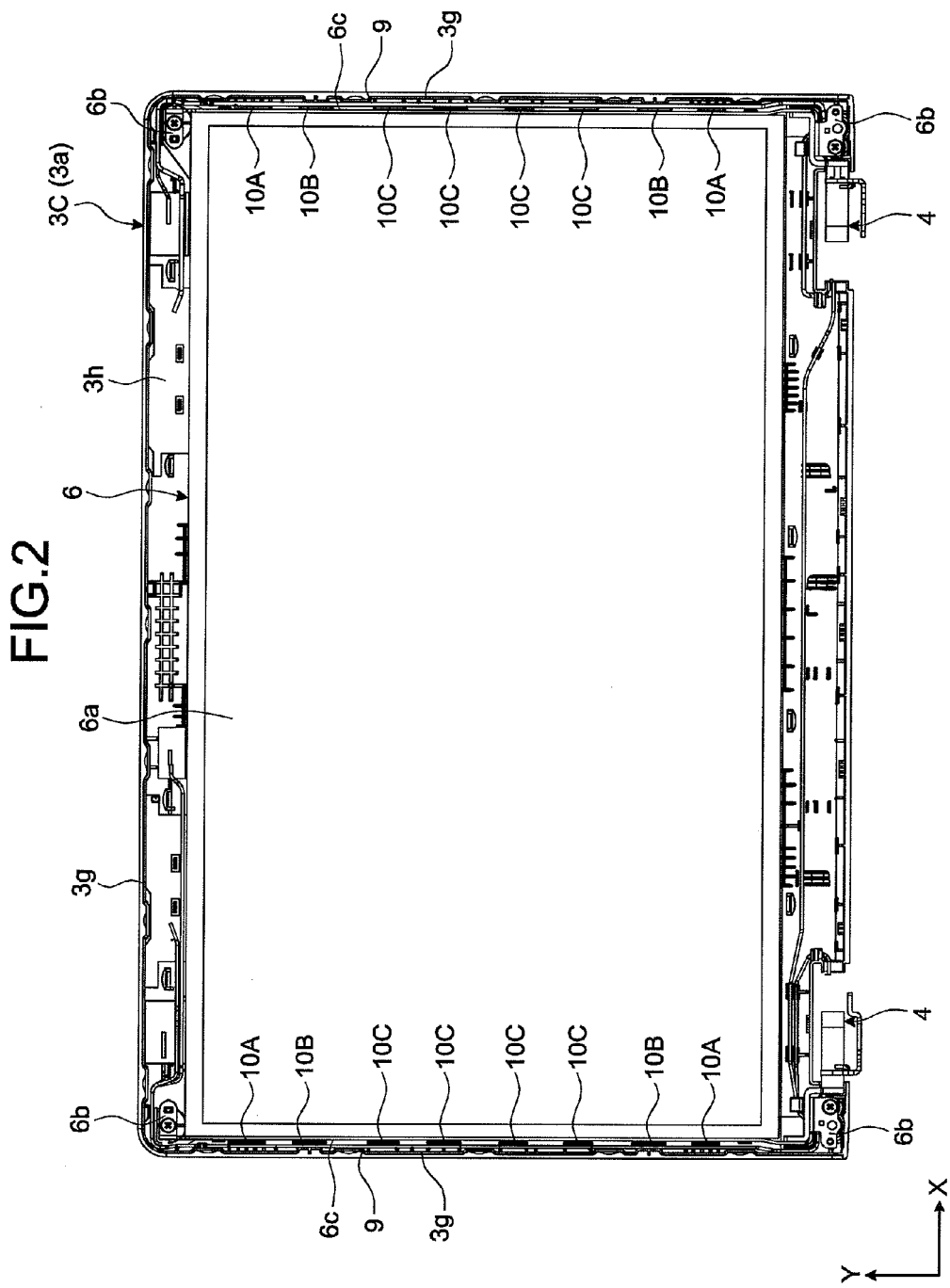
FIG. 2 is an exemplary plan view of the inside of the housing of a second body (on a first divisional body side) in the embodiment.
Figure 3:
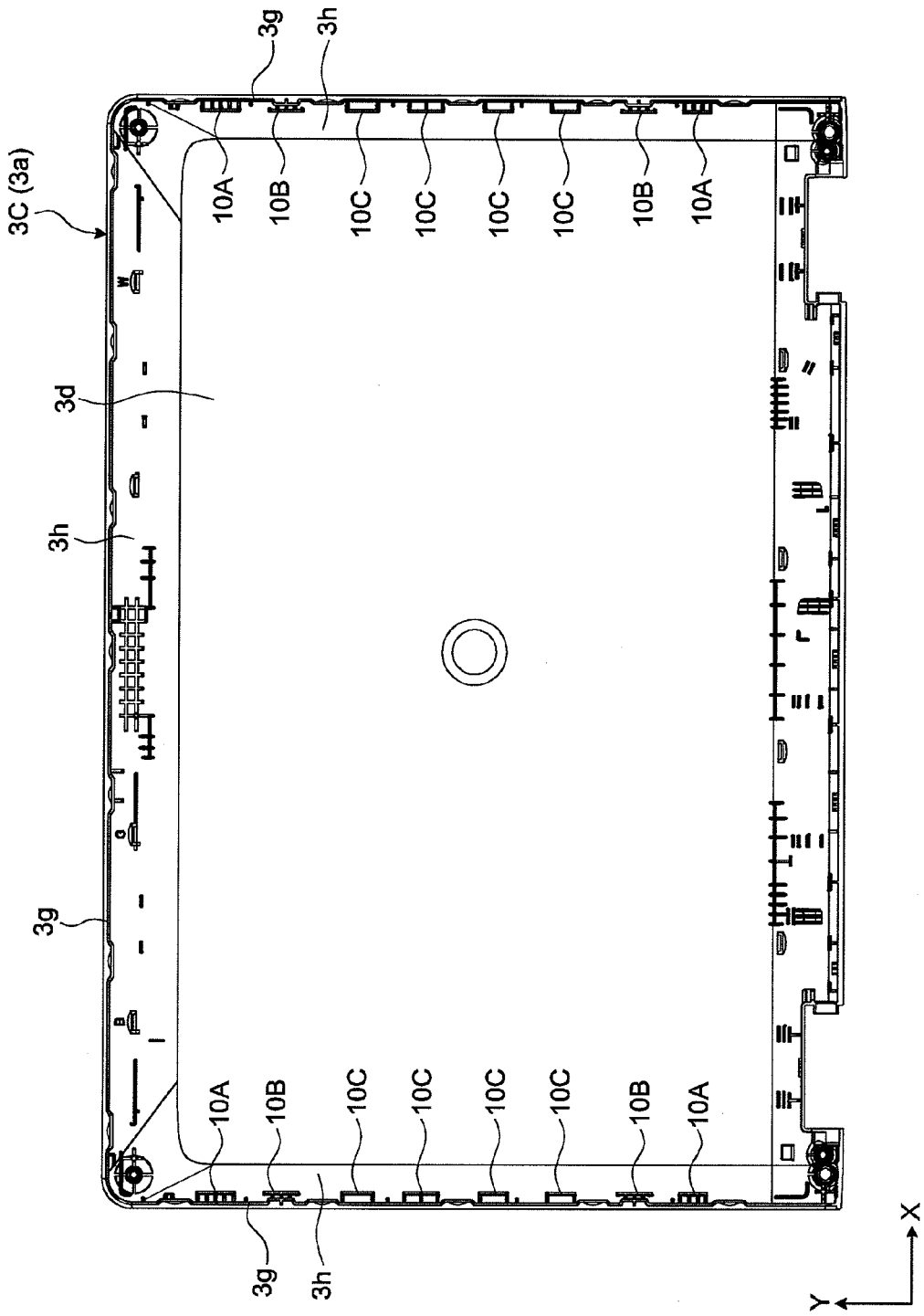
FIG. 3 is an exemplary plan view of the first divisional body viewed from the inside of the housing in the embodiment.

As illustrated in FIG. 2, the display device 6 is rectangular in a plan view from the Z direction. The display device 6 is attached at substantially the center of the first divisional body 3C. The location of the display device 6 is defined by brackets 6b provided to the four corners of the display device 6 or the like with respect to the first divisional body 3C. The display device 6 has a relatively thin (height in the Z direction) and flat shape.

Figure 6:
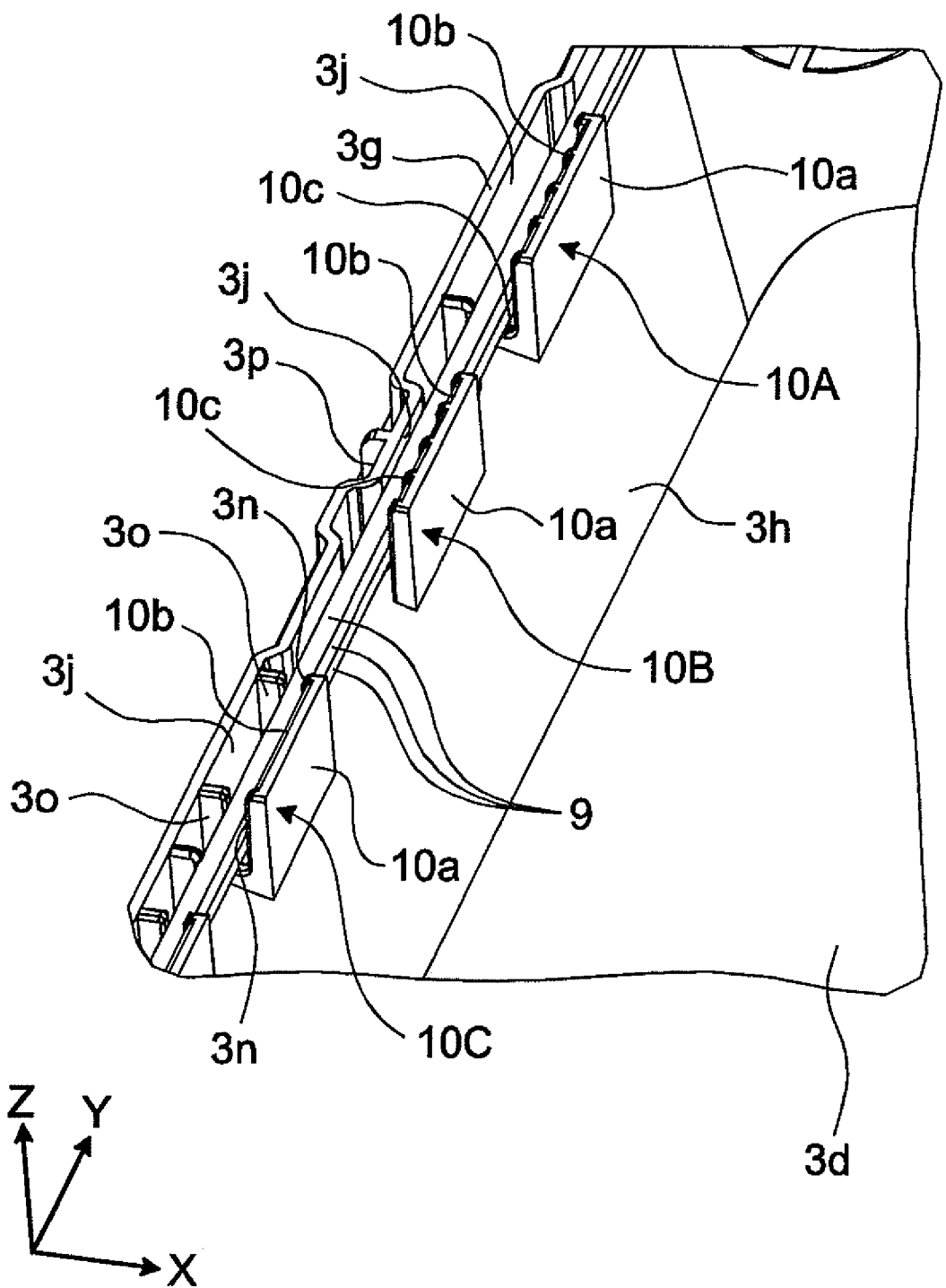
FIG. 6 is an exemplary view of the part illustrated in FIG. 5 where a harness is routed in the embodiment.

As illustrated in FIGS. 2 and 6, a cable 9 is routed in an elongated area between a side surface 6c of the display device 6 and an outer wall (periphery wall) 3g of the first divisional body 3C. The outer wall 3g is raised in the thickness direction (the Z direction) and is formed in a rectangular frame along the periphery of the second body 3. A plurality of the cables 9 (for example, three cables) may be routed in parallel depending on the location. The cable 9 may be, for example, an antenna cable.

Figure 4:
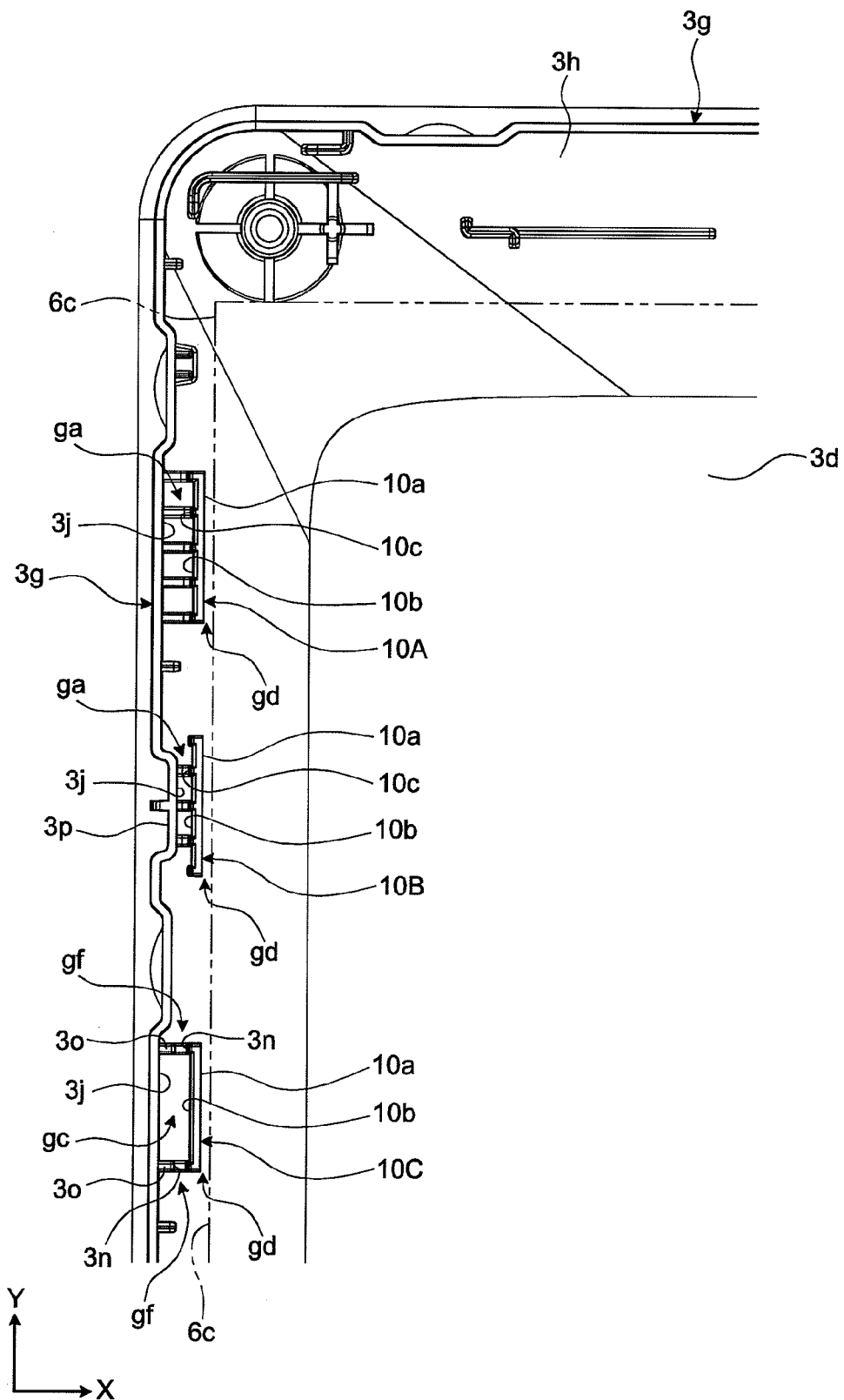
FIG. 4 is an exemplary enlarged view of part of the electronic device illustrated in FIG. 3 in the embodiment.
Figure 5:
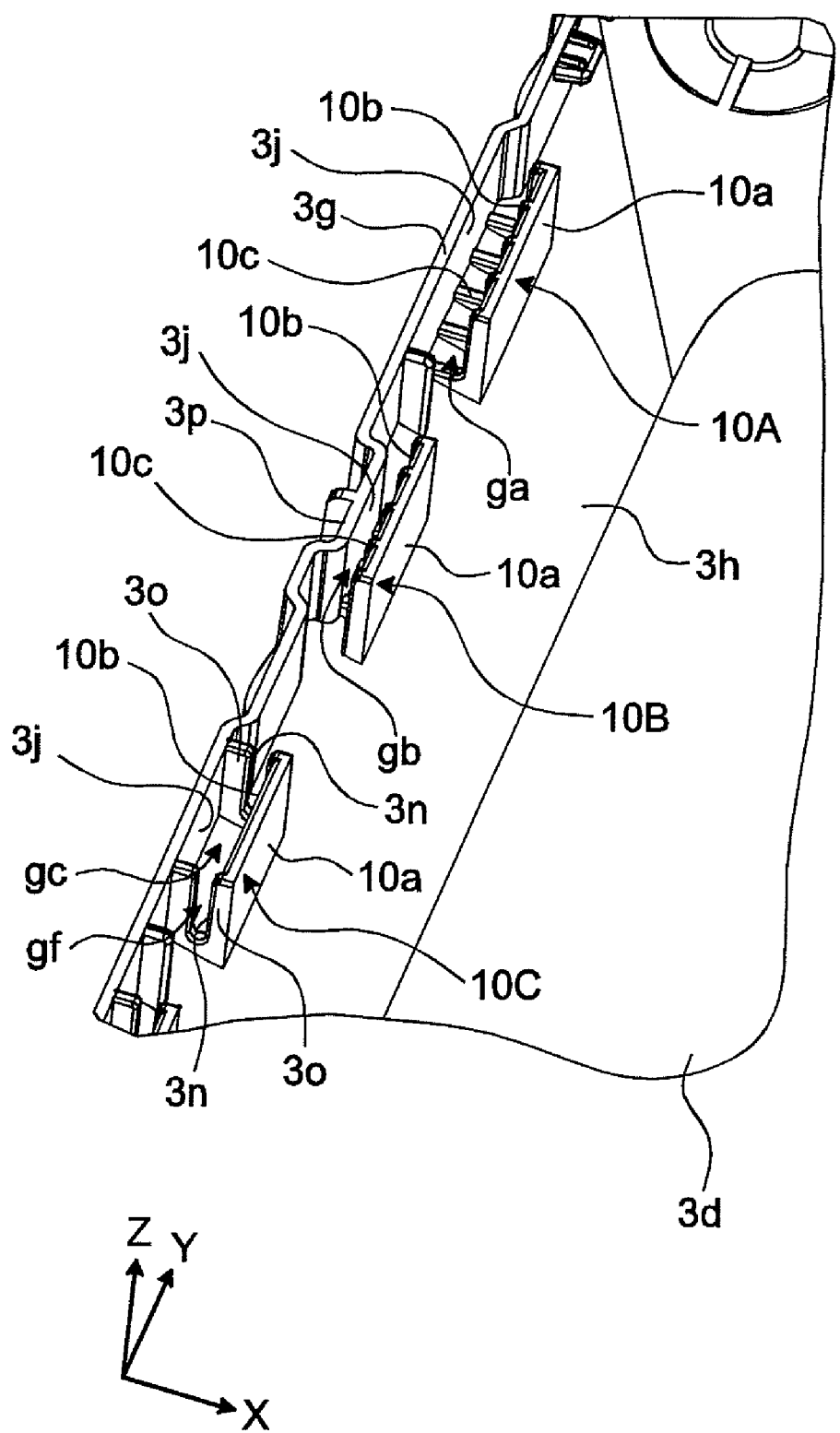
FIG. 5 is an exemplary perspective view of part of the first divisional body of the housing in the embodiment.

As illustrated in FIGS. 2 and 4, a plurality of ribs 10A, 10B, and 10C are provided between the outer wall 3g and the side surface 6c of the display device 6. In the embodiment, the three types of ribs 10A, 10B, and 10C, which are elongated along the outer wall 3g in a plan view, are arranged linearly spaced apart from each other along the outer wall 3g. As illustrated in FIGS. 5 and 6, the ribs 10A, 10B, and 10C are provided on an inclined boundary wall 3h between the bottom wall 3d and the outer wall 3g of the first divisional body 3C. The ribs 10A, 10B, and 10C protrude in the Z direction (the thickness direction of the second divisional body 3M) in substantially parallel to the outer wall 3g. The ribs 10A, 10B, and 10C each have an inner surface 10a and an outer surface 10b. The inner surface 10a faces the side surface 6c of the display device 6, while the outer surface 10b faces an inner surface 3j of the outer wall 3g. The ribs 10A, 10B, and 10C are located near the side surface 6c of the display device 6 compared to the outer wall 3g. A gap gd between the inner surface 10a of the each of the ribs 10A, 10B, and 10C and the side surface 6c of the display device 6 (see also FIG. 9) is substantially constant. Accordingly, in a plan view from the Z direction as illustrated in FIGS. 2 and 4, the ribs 10A, 10B, and 10C and also their inner surfaces 10a are arranged in substantially a straight line, and the inner surfaces 10a are located on a virtual plane spaced apart in parallel from the side surface 6c of the display device 6. In other words, the ribs 10A, 10B, and 10C aligned in a straight line are located to face the side surface 6c of the display device 6 with the small gap gd therefrom.

As illustrated in FIGS. 5 and 6, in a place where the ribs 10A, 10B, and 10C are located, the cable 9 is routed in gaps ga, gb, and gc (see FIG. 5) between the ribs 10A, 10B, and 10C and the outer wall 3g.

When, for example, the electronic device 1 accidentally falls off, the display device 6 may move in a direction approaching the outer wall 3g relative to the housing 3a due to the inertial force acting on the display device 6. In such a case, the ribs 10A, 10B, and 10C have the function of absorbing the impact load on the display device 6. That is, when the electronic device 1 falls off, if the display device 6 relatively moves toward the outer wall 3g along with the deformation of the periphery of the brackets 6b and other parts, the display device 6 may come in contact with the ribs 10A, 10B, and 10C. In the embodiment, the display device 6 in contact with the ribs 10A, 10B, and 10C deforms them by pressure. This deformation absorbs energy, thereby alleviating the relative impact load on the display device 6 from the housing 3a (the outer wall 3g, the ribs 10A, 10B, and 10C, etc.).

The ribs 10A, 10B, and 10C further have the function of protecting the cable 9 routed between the display device 6 and the outer wall 3g. That is, as described above, when the electronic device 1 falls off, if the display device 6 relatively moves toward the outer wall 3g along with the deformation of the periphery of the brackets 6b (see FIG. 2) and other parts, the display device 6 may come in contact with the ribs 10A, 10B, and 10C. In the embodiment, even in such a case, the ribs 10A, 10B, and 10C located between the display device 6 and the cable 9 prevents the cable 9 from being damaged by, for example, coming in contact with the display device 6, being stuck between the display device 6 and outer wall 3g, or the like.

In view of preventing damage to the cable 9, preferably, the ribs 10A, 10B, and 10C are not substantially inclined due to pressure caused by the relative movement of the display device 6. For this reason, in the embodiment, as illustrated in FIGS. 7 and 8, protrusions 3i are formed in the second divisional body 3M as stoppers to stop the ribs 10A, 10B, and 10C, and the like (in the embodiment, only the rib 10A).

Figure 7:
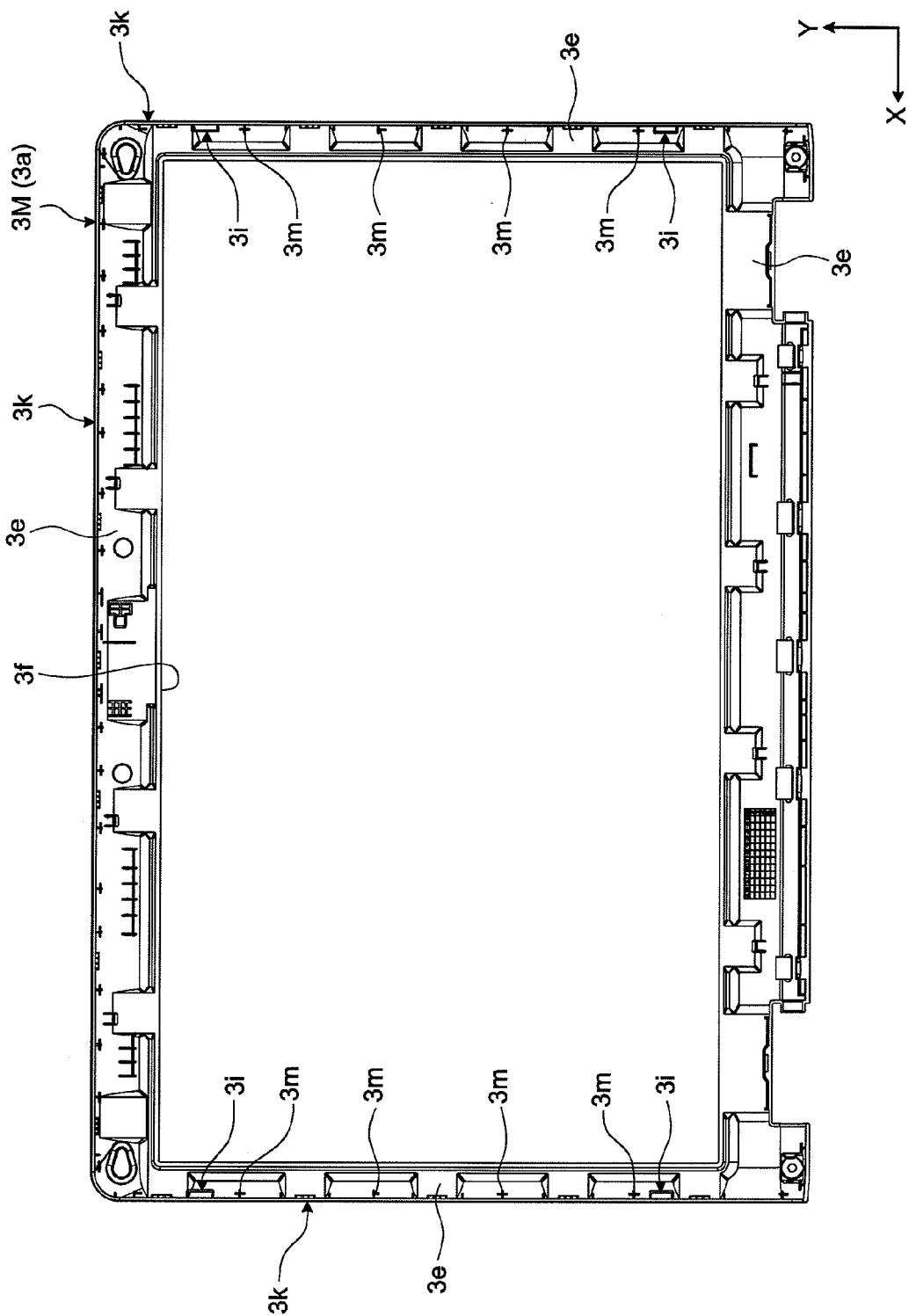
FIG. 7 is an exemplary plan view of a second divisional body viewed from the inside of the housing in the embodiment.
Figure 8:
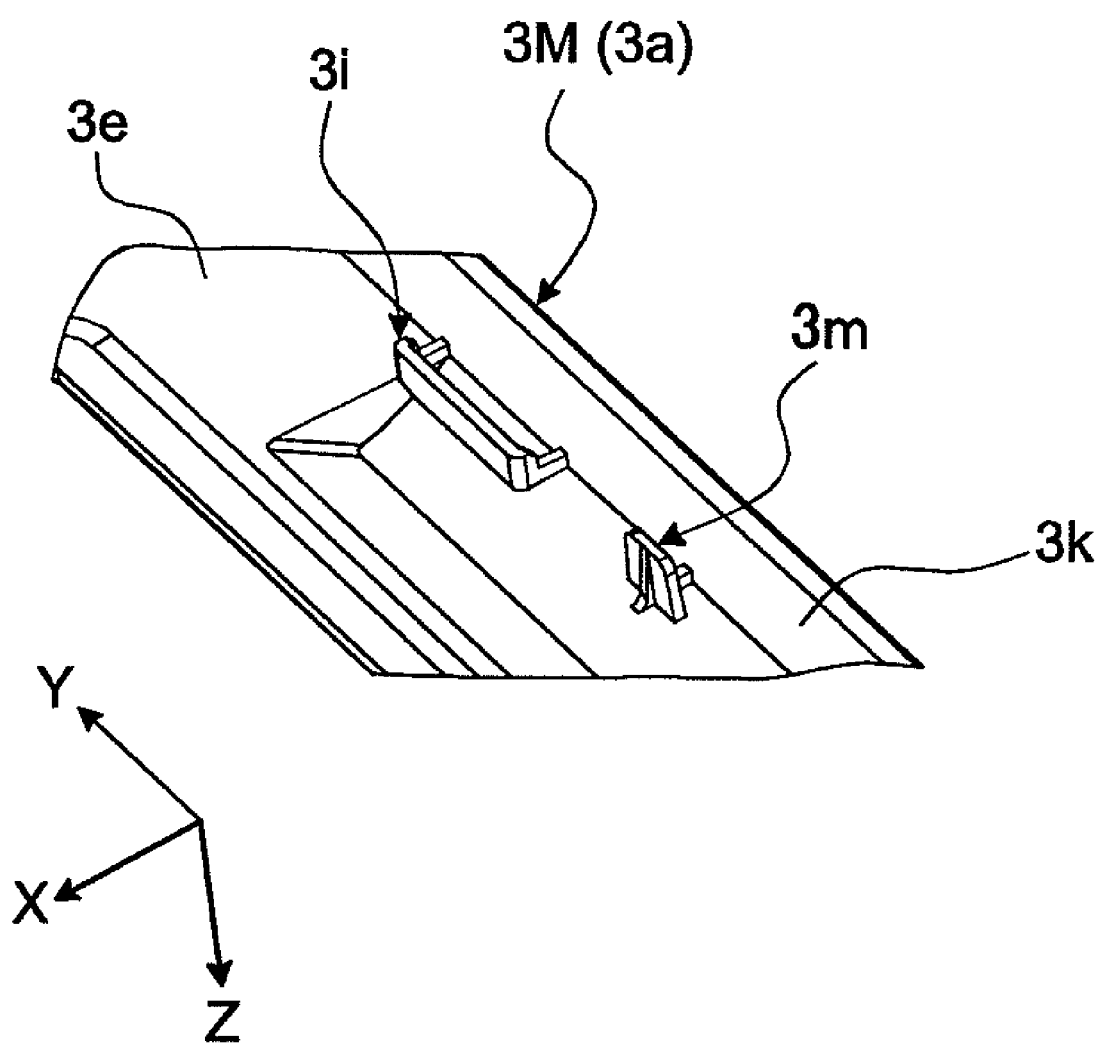
FIG. 8 is an exemplary perspective view of part of the second divisional body in the embodiment.

As illustrated in FIGS. 7 and 8, the second divisional body 3M has the top wall 3e and an outer wall (periphery wall) 3k. The top wall 3e is formed in a flat rectangular frame having the rectangular opening 3f inside it and forms the front surface 3b of the second body 3. The outer wall 3k is raised in the Z direction (the thickness direction of the second body 3) on the periphery of the top wall 3e. The protrusions 3i that stops the ribs 10A, 10B, and 10C are arranged spaced apart inside the outer wall 3k, and protrude in the Z direction along the outer wall 3k. The protrusions 3i are formed elongated in the Y direction.

Figure 9:
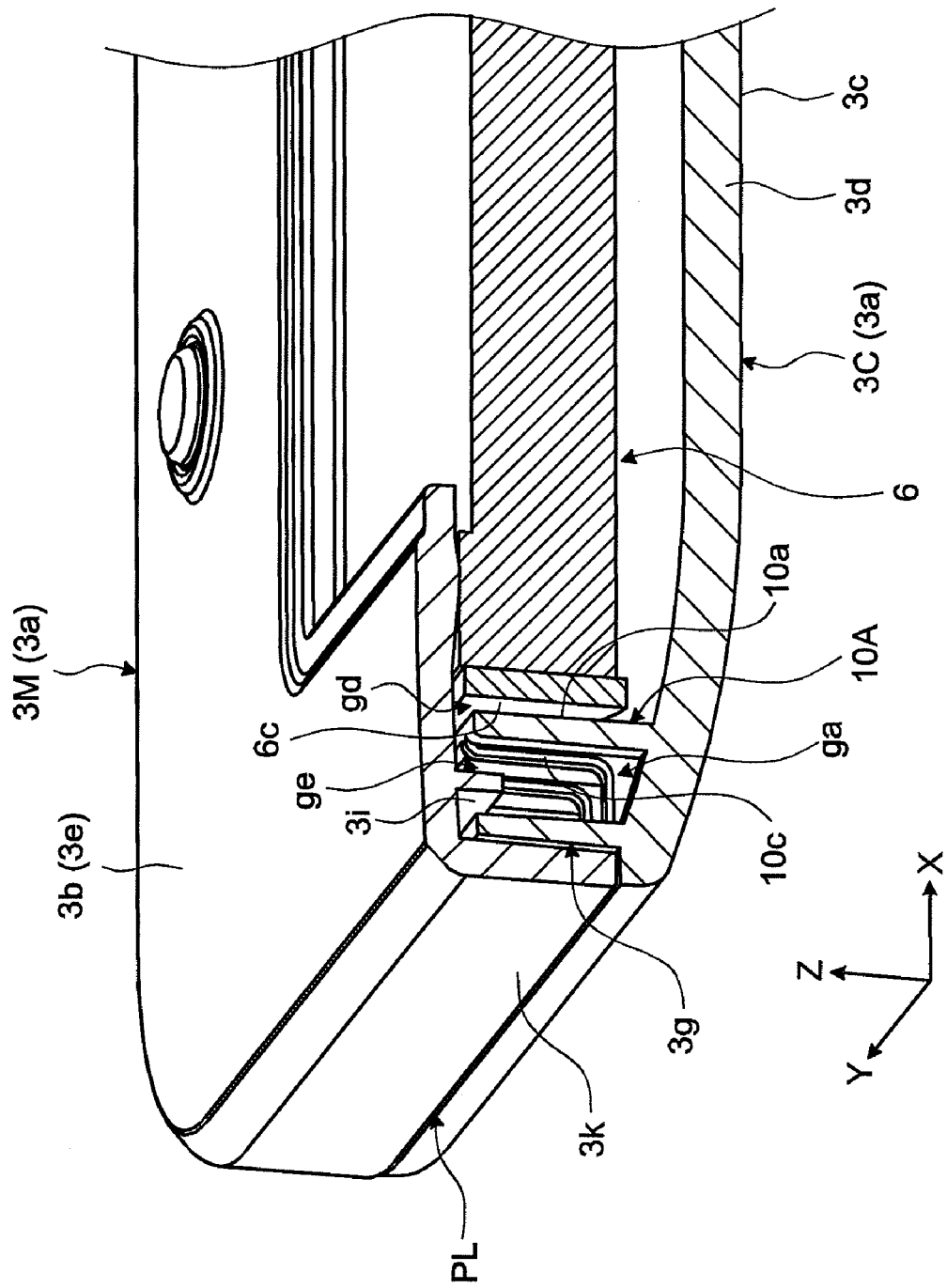
FIG. 9 is an exemplary perspective view of a cross-section of part provided with a first rib of the second divisional body and a stopper in the embodiment.

As illustrated in FIG. 9, the protrusion 3i extends from the edge side to base side of the rib 10A (from up to down in FIG. 9) in the gap ga between the outer wall 3g of the first divisional body 3C and the rib 10A. In the view of the X direction (the horizontal direction in FIG. 9), the protrusion 3i overlaps the edge of the rib 10A. Accordingly, when the rib 10A is pressed by the display device 6 and inclined outward (to the left in FIG. 9), the edge of the rib 10A is stopped by the protrusion 3i. After the protrusion 3i stops the rib 10A, the rib 10A is not likely to be inclined. This prevents damage to the cable 9 routed in the gap ga caused by an interference with the rib 10A. Note that the protrusion 3i as a stopper is only required to stop the rib 10A being inclined or about to be inclined pressed by the display device 6, and does not need to stop the rib 10A while the display device 6 is not moving relative to the housing 3a.

Figure 10:
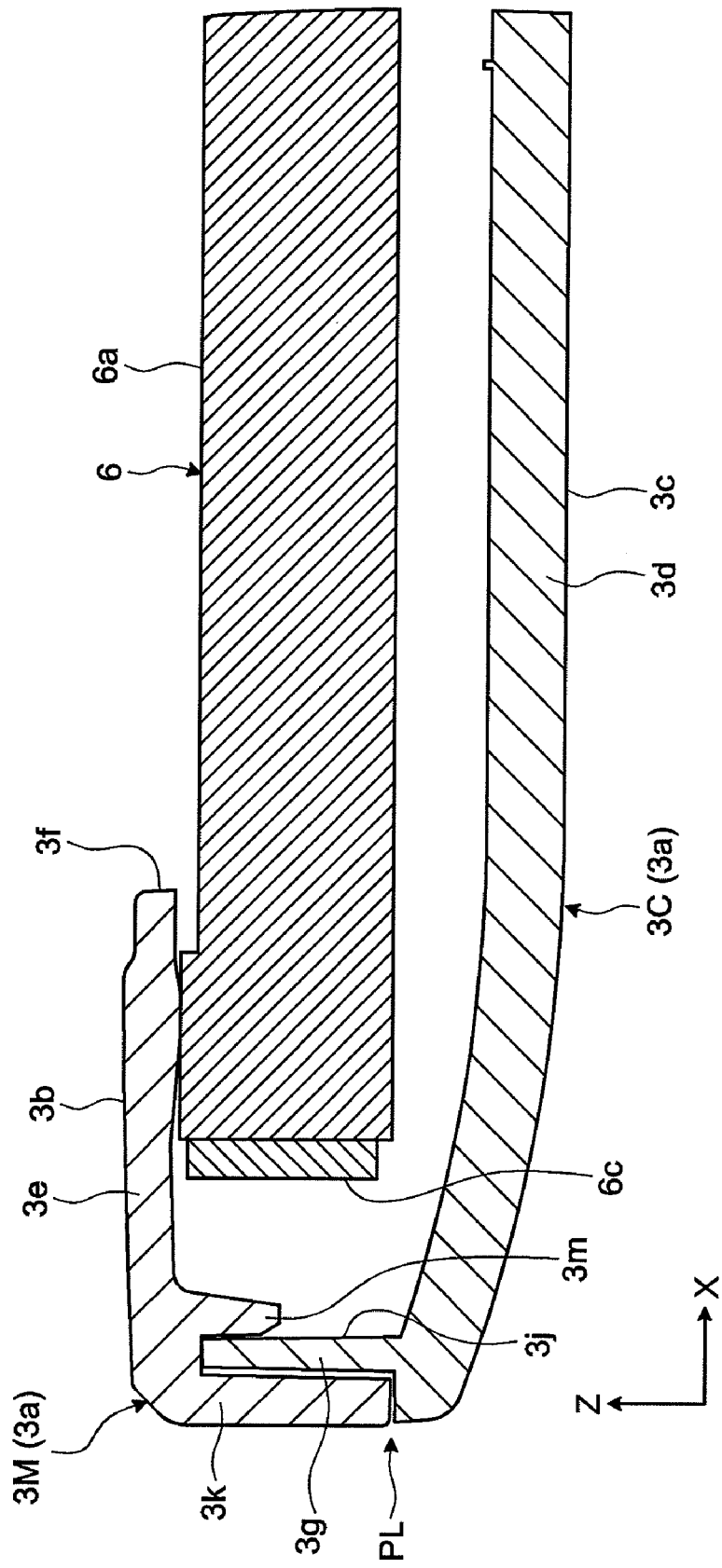
FIG. 10 is an exemplary cross-sectional view of part provided with a second stopper of the second divisional body in the embodiment.

As illustrated in FIG. 9, in the embodiment, the outer wall 3k of the second divisional body 3M is located adjacent to the outside (the left side in FIG. 9) of the outer wall 3g of the first divisional body 3C. With this, a boundary PL between the first divisional body 3C and the second divisional body 3M on the side surface is located on the side of the back surface 3c of the second body 3, i.e., at a position distant from the user who is using the electronic device 1, which improves the visual appearance. Suppose that the display device 6 moves to the outside (to the left side in FIG. 9) relative to the first divisional body 3C when the electronic device 1 falls, and the rib 10A is inclined outward (to the left side in FIG. 9) and engages the protrusion 3i, and the display device 6 further relatively moves to the outside (to the left side in FIG. 9). In this case, if the second divisional body 3M moves outward relative to the first divisional body 3C together with the protrusion 3i, the protrusion 3i cannot perform its function. In the above arrangement of the outer walls 3k and 3g, the outer wall 3g of the first divisional body 3C does not constitute an obstacle to the outward movement of the second divisional body 3M. In view of this, according to the embodiment, second protrusions 3m are provided inside the outer wall 3k of the second divisional body 3M as second stoppers that engages the outer wall 3g, as illustrated in FIG. 10. When the display device 6 moves to the outside (to the left side in FIG. 9) relative to the first divisional body 3C when the electronic device 1 falls, and the rib 10A is inclined outward (to the left side in FIG. 9) and engages the protrusion 3i, and the display device 6 further relatively moves to the outside (to the left side in FIG. 9), the second protrusion 3m engages the outer wall 3g. Accordingly, the second divisional body 3M is prevented from moving outward relative to the first divisional body 3C. Thus, it is possible to avoid the situation where the second divisional body 3M moves outward relative to the first divisional body 3C together with the protrusion 3i, and the protrusion 3i cannot perform its function.

As illustrated in FIG. 7, The second protrusions 3m are arranged spaced apart along the outer wall 3k. In the embodiment, the second protrusions 3m are arranged correspondingly to spaces between the ribs 10A, 10B, and 10C, and does not extend into the gaps ga, gb, and gc between the ribs 10A, 10B, and 10C and the outer wall 3g. This is because if the second protrusions 3m extend into the gaps ga, gb, and gc, the space to route the cable 9 is reduced. As illustrated in FIG. 8, the second protrusions 3m are formed higher than the protrusions 3i.

A description will now be given of each of the ribs 10A, 10B, and 10C. As illustrated in FIGS. 4, 5, and 9, a convex reinforcing rib 10c is provided on the side of the outer surface 10b of the rib 10A as a reinforcing member to increase the rigidity and the strength. In the embodiment, the rigidity and the strength of the rib 10A is the highest among the ribs 10A, 10B, and 10C. This is because, if the display device 6 moves relative to the outer wall 3g while being inclined, with respect to the rib 10A that is located at the end of the array and has the adjacent ribs 10B and 10C on only one side, the load is less distributed, and a heavier load may act thereon from the corners of the display device 6. The inner surface 3j of the outer wall 3g is formed flat. The flat inner surface 3j prevents the cable 9 from being concentrically-loaded, which reduces damage to the cable 9.

To overcome a heavier load, the protrusion 3i is provided as a stopper correspondingly to the rib 10A located at the end of the array. More specifically, in the state where the first divisional body 3C and the second divisional body 3M are assembled, the protrusion 3i is inserted in the gap ga between the rib 10A and the outer wall 3g. A gap ge is formed between the rib 10A and the protrusion 3i. Accordingly, when the rib 10A is pressed by the display device 6 and inclined, energy is absorbed by the deformation of the rib 10A until the rib 10A is stopped by the protrusion 3i.

A space (the gap ga) between the rib 10A and the outer wall 3g is larger than that between the rib 10B and the outer wall 3g. In other words, a larger space is secured in which the cable 9 is allowed to move. This prevents damage to the cable 9, and also compensates for reduction in the space by the protrusion 3i inserted in the gap ga between the rib 10A and the outer wall 3g.

As illustrated in FIGS. 4 and 5, the convex reinforcing rib 10c is provided also on the side of the outer surface 10b of the rib 10B to increase the rigidity and the strength. The inner surface 3j of the outer wall 3g is also formed flat.

The gap gb is smaller than the gap ga between the rib 10A and the outer wall 3g. The smaller gap gb increases the capability of retaining the cable 9, which prevents the cable 9 from deviating from the original route. The rib 10B is located in the middle of the array, and therefore the load is likely to be distributed and low compared to that on the rib 10A. Accordingly, even if the gap gb is smaller than the gap ga, it is possible to reduce damage to the cable 9.

The outer wall 3g is partly recessed at a portion facing the rib 10B as a recessed portion 3p. If the gap gb is formed smaller than the gap ga while the outer wall 3g is formed in a straight shape, the rib 10B needs to be positioned outside the rib 10A or formed thicker. It is not preferable to position the rib 10B outside in view of shock absorption. Meanwhile, it is not preferable to form the rib 10B thicker because it results in an increase in the weight. Regarding this point, according to the embodiment, the rib 10B can be easily aligned with respect to the rib 10A separated from the outer wall 3g by the larger gap ga. Moreover, by providing a convexo-concave surface to the outer wall 3g, the rigidity of the outer wall 3g can be improved.

As illustrated in FIGS. 4 and 5, between the rib 10C and the outer wall 3g, a vertical wall 3o is provided in which a notch 3n can be formed. By inserting the cable 9 in the notch 3n, it is possible to increase the capability of retaining the cable 9. In an array of the ribs 10A, 10B, and 10C, the rib 10C is located closest to the center (the center of the side surface 6c of the display device 6). Therefore, the load on the rib 10C is distributed and is likely to be lighter than that on the rib 10A. Thus, even if a gap gf of the notch 3n is smaller than the gaps ga and gb, it is possible to reduce damage to the cable 9.

With the vertical wall 3o in which the notch 3n can be formed, the gap gf smaller than the other gaps ga and gb can be relatively easily obtained regardless of the relative positions of the outer wall 3g and the rib 10c.

As described above, according to the embodiment, the electronic device 1 comprises the housing 3a, the outer wall 3g, the ribs 10A, 10B, and 10C, the cable 9, and the protrusion 3i. The housing 3a houses at least part of the display device 6 as an electronic component therein. The outer wall 3g forms at least part of the outer contour of the housing 3a. The ribs 10A, 10B, and 10C are located between the outer wall 3g of the housing 3a and the display device 6, and the outer surface 10b of them faces the inner surface 3j of the outer wall 3g. The cable 9 is located between the outer wall 3g and the ribs 10A, 10B, and 10C. The protrusion 3i is provided to the housing 3a and stops the rib 10A as a stopper. With this, if the display device 6 relatively moves toward the outer wall 3g by some cause such as the fall of the electronic device 1, the protrusion 3i prevents the rib 10A which is pressed by the display device 6 from being inclined outside of where the cable 9 is routed. Thus, protection for the cable 9 can be improved. Moreover, the stopper can be formed with a relatively simple structure as the protrusion 3i located outside the rib 10A.

According to the embodiment, the housing 3a comprises the first divisional body 3C and the second divisional body 3M. The first divisional body 3C is provided with the outer wall 3g and the ribs 10A, 10B, and 10C, while the second divisional body 3M is provided with the protrusion 3i as a stopper. This structure can be applied to a housing having a plurality of divisional bodies such as the second body 3 of the electronic device 1. With this, a structure in which the rib 10A is stopped by the protrusion 3i can be relatively easily obtained by assembling the first divisional body 3C with the second divisional body 3M after routing the cable 9 in a recessed portion surrounded by the outer wall 3g, the ribs 10A, 10B, and 10C, and the bottom wall 3d of the first divisional body 3C. Especially, in the structure in which the outer wall 3g and the ribs 10A, 10B, and 10C are provided on the bottom wall 3d of the first divisional body 3C, the cable 9 is routed in the recessed portion surrounded by the outer wall 3g, the ribs 10A, 10B, and 10C, and the bottom wall 3d, and the protrusion 3i is formed on the top wall 3e of the second divisional body 3M, the protrusion 3i is located on the edge side of the rib 10A. Thus, the protrusion 3i is not likely to interfere the cable 9 routed on the bottom wall 3d side in the recessed portion.

According to the embodiment, the second protrusion 3m is provided to the second divisional body 3M inside the outer wall 3g of the first divisional body 3C as a second stopper that engages the outer wall 3g. When the display device 6 that relatively moves outward presses the protrusion 3i through the rib 10A, the second protrusion 3m engages the outer wall 3g of the first divisional body 3C, thereby preventing the protrusion 3i from moving to the outside. Thus, it is possible to reliably achieve the effect of preventing the inclination of the rib 10A by the protrusion 3i.

According to the embodiment, at least part of the inner surface 3j of the outer wall 3g that faces the outer surface 10b of the ribs 10A, 10B, and 10C is formed flat. The flat inner surface 3j prevents the cable 9 from being concentrically-loaded, thereby improving the protection for the cable 9.

According to the embodiment, the reinforcing rib 10c is formed on the outer surface 10b of the ribs 10A and 10B as a reinforcing member including a convex portion. Meanwhile, the inner surface 3j of the outer wall 3g that faces the outer surface 10b is formed flat. This increases the rigidity and the strength of the ribs 10A and 10B as well as improving the protection for the cable 9.

According to the embodiment, the ribs 10A, 10B, and 10C are provided so that the gaps ga, gb, and gc between them and the outer wall 3g are different in size. The outer wall 3g is partly recessed at a portion facing the rib 10B with the small gap gb as the recessed portion 3p. This facilitates linear alignment of the rib 10A with the large gap ga and the rib 10B with the small gap gb, and also prevents the load from electronic components from concentrating on specific one of the ribs 10A, 10B, and 10C.

According to the embodiment, the ribs 10A, 10B, and 10C are linearly aligned spaced apart in a plan view from the direction in which the ribs 10A, 10B, and 10C are raised (the Z direction). The display device 6 as an electronic component is arranged so that the side surface 6c thereof faces the inside of an array of the ribs 10A, 10B, and 10C. The protrusion 3i is provided as a stopper correspondingly to at least the rib 10A located at the end of the array. The protrusion 3i prevents the inclination of the rib 10A that is located at the end of the array and may be loaded most heavily. Thus, it is possible to effectively prevent damage to the cable 9.

According to the embodiment, the ribs 10A, 10B, and 10C are provided so that the gaps ga, gb, and gc between them and the outer wall 3g are different in size. The ribs 10A, 10B, and 10C are linearly aligned spaced apart in a plan view from the direction in which the ribs 10A, 10B, and 10C are raised (the Z direction). The display device 6 as an electronic component is arranged so that the side surface 6c thereof faces the inside of an array of the ribs 10A, 10B, and 10C. Among the ribs 10A, 10B, and 10C, the rib 10B with the small gap gb is located at a middle position of the array except for the ends. Since the rib 10B with the small gap gb is located at a middle position of the array except for the ends where the load acting from the display device 6 is likely to be lighter, it is possible to increase the capability of retaining the cable 9 as well as to prevent damage to the cable 9.

According to the embodiment, the ribs 10A, 10B, and 10C are provided so that the gaps ga, gb, and gc between them and the outer wall 3g are different in size. The display device 6 as an electronic component is arranged so that the side surface 6c thereof faces the inside of an array of the ribs 10A, 10B, and 10C. The plurality of cables 9 are arranged in parallel in the direction along the outer surface 10b or the inner surface 3j, more specifically, in the direction in which the rib 10B is raised, at least between the outer wall 3g and the rib 10B with the small gap gb. This prevents an increase in the size of the housing 3a with respect to the size of the display device 6 viewed from the Z direction. By reducing the size of the gap gb with respect to each of the cables 9, it is possible to increase the capability of retaining the cable 9.

While the electronic device 1 of the embodiment is described above by way of example as a notebook personal computer, it may be any other electronic device than a notebook personal computer. Besides, the ribs may be arranged to face another side surface of the display device. The ribs may also be arranged correspondingly to another electronic device than the display device. The specification (location, size, shape, direction, etc.) can be changed as required for the outer wall, the ribs, the stopper, the second stopper, the electronic component, the reinforcing member, and the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A electronic device comprising:
   a housing configured to house at least part of an electronic component;
   a rib located between an outer wall of the housing and the electronic component;
   a cable routed between the outer wall and the rib; and
   a stopper in the housing, the stopper being configured to engage the rib and capable of preventing the rib from inclining toward the outer wall.

2. The electronic device of claim 1, wherein the housing comprises
   a first divisional body provided with the outer wall and the rib, and
   a second divisional body provided with the stopper.

3. The electronic device of claim 2, wherein the second divisional body is provided with a second stopper on the electronic component side of the outer wall of the first divisional body, the second stopper engaging the outer wall.

4. The electronic device of claim 1, wherein the stopper is a protrusion arranged on the outer wall side of the rib.

5. The electronic device of claim 1, wherein at least one of a surface of the outer wall side of the rib and a surface of the rib side of the outer wall is substantially flat.

6. The electronic device of claim 5, wherein
   the rib comprises a reinforcing member comprising a convex portion on the surface of the outer wall side, and
   the surface of the rib side of the outer wall is substantially flat.

7. The electronic device of claim 1, wherein
   the rib comprises a plurality of ribs,
   gaps between the outer wall and the ribs are different in size,
   the electronic device further comprising recessed portion outside the housing of one of the ribs with a small gap of the outer wall, the recessed portion being recessed inside the housing.

8. The electronic device of claim 1, wherein
   the rib comprises a plurality of ribs,
   the ribs are linearly arranged along the outer wall, and
   the stopper is arranged correspondingly to at least one of the ribs located at an end of an array of the ribs.

9. The electronic device of claim 1, wherein
   the rib comprises a plurality of ribs,
   gaps between the outer wall and the ribs are different in size, the ribs are linearly arranged so that a side surface of the electronic along the outer wall, and one of the ribs with a small gap is located at a middle position of an array of the ribs except for ends of the array.

10. The electronic device of claim 1, wherein the rib comprises a plurality of ribs, gaps between the outer wall and the ribs are different in size, the ribs are linearly arranged along the outer wall, the cable comprises a plurality of cables, and the cables are arranged in parallel at least between the outer wall and one of the ribs with a small gap in a direction along at least one of a surface of the outer wall side of the one of the ribs and a surface of the one of the ribs side of the outer wall.

* * * * *